(12) United States Patent
Setagawa

(10) Patent No.: US 8,605,353 B2
(45) Date of Patent: Dec. 10, 2013

(54) LIQUID FOR ELECTROPHORETIC DISPLAY AND ELECTROPHORETIC DISPLAY DEVICE AND ELECTRONIC DEVICE PREPARERD USING THE SAME

(75) Inventor: Yosuke Setagawa, Fujioka (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 0 days.

(21) Appl. No.: 13/256,086

(22) PCT Filed: Mar. 2, 2010

(86) PCT No.: PCT/JP2010/053457
§ 371 (c)(1),
(2), (4) Date: Nov. 1, 2011

(87) PCT Pub. No.: WO2010/103979
PCT Pub. Date: Sep. 16, 2010

(65) Prior Publication Data
US 2012/0057218 A1 Mar. 8, 2012

(30) Foreign Application Priority Data

Mar. 13, 2009 (JP) ................................. 2009-061458
Mar. 1, 2010 (JP) ................................. 2010-044410

(51) Int. Cl.
*G02B 26/00* (2006.01)
*G02F 1/133* (2006.01)
*G03G 17/04* (2006.01)
*G09G 3/34* (2006.01)

(52) U.S. Cl.
USPC ................ 359/296; 349/33; 430/32; 345/107

(58) Field of Classification Search
USPC ............... 359/296; 349/33; 345/49, 105, 107; 430/31–32
See application file for complete search history.

(56) References Cited

U.S. PATENT DOCUMENTS 3,612,758 A 10/1971 Evans et al.
6,017,584 A * 1/2000 Albert et al. ............... 427/213.3
(Continued)

FOREIGN PATENT DOCUMENTS

JP 62-269124 A 11/1987
JP 63-050886 A 3/1988
(Continued)

OTHER PUBLICATIONS

International Search Report of PCT/JP2010/053457, mailing date Apr. 6, 2010.
(Continued)

*Primary Examiner* — Dawayne A Pinkney
(74) *Attorney, Agent, or Firm* — Westerman, Hattori, Daniels & Adrian, LLP

(57) ABSTRACT

A liquid for electrophoretic display which makes it possible to display a black color having a low reflectance or a color having a high color saturation and a white color having a high reflectance and display them at high contrast and which inhibits coagulation of white fine particles and is excellent in stability can be prepared by using a liquid for electrophoretic display containing at least white fine particles, resin particles colored by a dye and/or a pigment and a liquid phase dispersion medium, wherein fine particles in which a difference in a refractive index from the liquid phase dispersion medium is 0 to 0.05 are contained and have an average particle diameter of 50 to 500 nm.

The electrophoretic display device of the present invention is prepared by filling the liquid for electrophoretic display between a pair of substrates, and the electronic device of the present invention is characterized by mounting therein the electrophoretic display device.

6 Claims, 1 Drawing Sheet

(56) References Cited

U.S. PATENT DOCUMENTS

2005/0213191 A1  9/2005  Whitesides et al.
2006/0146394 A1* 7/2006  Kaga et al. ................... 359/296

FOREIGN PATENT DOCUMENTS

| JP | 08-510790 A | 11/1996 |
| JP | 2551783 B2 | 11/1996 |
| JP | 2733687 B2 | 3/1998 |
| JP | 2002-277903 A | 9/2002 |
| JP | 2005-326456 A | 11/2005 |
| JP | 2006-220969 A | 8/2006 |
| JP | 2007-108347 A | 4/2007 |
| JP | 2008-158067 A | 7/2008 |
| JP | 4643559 B2 | 3/2011 |
| WO | 98/03896 A1 | 1/1998 |
| WO | 2004/072721 A1 | 8/2004 |

OTHER PUBLICATIONS

Notification of Transmittal of Translation of the International Preliminary Report on Patentability (Form PCT/IB/338) of International Application No. PCT/JP2010/053457 mailed Oct. 27, 2011 with Forms PCT/IB/373 and PCT/ISA/237.

Supplemental European Search Report Application No. 10750733.7 mailed Nov. 8, 2012.

* cited by examiner

LIQUID FOR ELECTROPHORETIC DISPLAY AND ELECTROPHORETIC DISPLAY DEVICE AND ELECTRONIC DEVICE PREPARERD USING THE SAME

TECHNICAL FIELD

The present invention relates to a liquid for electrophoretic display which can reversibly change a visible state by action of an electrical field and an electrophoretic display device and an electronic device each prepared by using the same.

BACKGROUND ART

In recent years, demands for reduction in electric power consumption of display devices, reduction in thickness and increase in flexibility grow larger as information devices advance, and research and development of display devices which meet the above demands are actively carried out.

An electrophoretic display device invented by Harold D. Lees et al. is known as one of the above display devices (refer to, for example, patent document 1). The electrophoretic display device has a structure in which two electrode substrates, out of which at least one is transparent, are oppositely disposed via suitable spacers and in which a display liquid prepared by dispersing fine particles (pigment particles) in a dispersion medium colored differently from the color of the fine particles is filled into a space between the above electrode substrates to prepare a display panel, and display is shown on the transparent electrode face by applying an electric field to the display panel.

A liquid for electrophoretic display filled between the electrode substrates is constituted from fine particles of titanium oxide and the like (pigment particles), a dispersion medium having a low dielectric constant such as xylene, tetrachloroethylene, paraffin, silicone oil in which a dye for providing contrast of a color against the fine particles is dissolved, a dispersant such as a surfactant and additives such as an electric charge-providing agent. The fine particles in the display liquid transfer to a transparent electrode side by applying an electric field to the liquid for electrophoretic display to allow the color of the fine particles to appear on the display face. Further, the fine particles transfer to a reverse side by applying an electric field in a direction which is reverse to the above to allow the color of the dispersion medium colored by the dye to appear on the display face.

The above electrophoretic display device is a display device in which desired display can be obtained by controlling a direction of an electric field, and it has advantages that it provides a low cost and has a viewing angle which is as broad as those of printed matters and that it is small in electric power consumption and has a memory property of display, so that it is paid attention as an inexpensive display device.

Since the display liquids for the above electrophoretic display devices is prepared usually by dispersing an inorganic pigment having a high refractive index such as titanium dioxide in a hydrophobic dispersion medium having a low dielectric constant which is colored by dissolving therein a dye, it is difficult to control dispersion stability thereof, and the liquid has defects that coagulation of the pigment brings about reduction in the contrast and the repetitive display characteristics and reduction in the display quality.

Further, since the dye solution is used, it has the defect that the contrast is reduced by adsorption of the dye onto the pigment surface. Accordingly, a lot of proposals for stabilizing the dispersion systems and improving the display characteristics have so far been made in order to solve the above problems.

For example, a technique in which sorbitan fatty acid ester surfactants are added to a system using electrophoretic particles subjected to surface treatment with a titanate coupling agent in a dispersion medium colored by a dye is proposed as a means for raising the dispersion stability (refer to, for example, patent documents 2 and 3).

However, an effect of the stabilization of dispersion has not yet reached a satisfactory level, and room for study is present still in the contrast of the display.

On the other hand, it is proposed as a means for improving the contrast that a dye which is non-adsorptive to a pigment surface is used as a dye used for coloring a dispersion medium and that a dye concentration in a dispersion medium is reduced.

However, the methods do not come to completely solve the defects brought about by the dye solutions described above and still have problems in terms of practical use.

Further, a method in which a microcapsule is filled with a display liquid for electrophoretic display and used as a display particle is proposed as a method for preventing unequal display caused by uneven distribution of electrophoretic fine particles on a display face (refer to, for example, patent document 4).

However, also in the method, a colored dye solution and a dispersion liquid of pigment particles are used in a display liquid filled, and therefore a problem resides in that it is not satisfactory in terms of contrast as is the case with the phenomenon described above.

Then, an electrophoretic display device in which a dye solution is not used is proposed as a means for solving the defects involved in the systems in which a dispersion medium colored by a dye is used. Proposed is, for example, an electrophoretic display device in which a liquid prepared by dispersing at least two kinds of electrophoretic fine particles different in a color tone and an electrophoretic property from each other in a colorless dispersion medium is filled in a cell formed via spacers between two oppositely disposed electrodes out of which at least is transparent (refer to, for example, patent document 5).

However, electrified charge of the electrophoretic fine particles having different color tones is combination of a positive charge and a negative charge, and therefore involved therein is the problem that an electric attracting force is produced between the fine particles to cause coagulation of the fine particles, whereby the dispersion stability is reduced to bring about reduction in the contrast by mixed color.

Also, use of a steric repulsion effect brought about by addition of a charge-controlling agent and surface treatment of particles is known as a means for preventing coagulation between particles which is a problem in a system using, as a display liquid for electrophoretic display, the above liquid prepared by dispersing two kinds of the electrophoretic fine particles which are different from each other in a color tone and an electrophoretic property (electrified charge) (refer to, for example, patent document 6). In this case, however, involved therein is the problem that it is difficult as well to completely prevent coagulation of two kinds of the electrophoretic fine particles and that good contrast can not be actualized.

Further, proposed is an electrophoretic display device prepared by using a liquid dispersed at least two kinds of electrophoretic fine particles which have the same electrophoretic property and which are different in a color tone and an electrophoretic speed from each other in a colorless dispersion medium (refer to, for example, patent document 7). In the electrophoretic display device, however, even the particles moving at a slow speed move only a shorter distance when present close to the electrode on the display face and therefore appear on the display face in a certain case. Also, an electrified charge is usually different even between particles having the same color tone, and the moving speed thereof has distribution. Accordingly, involved therein is the problem that it is difficult to obtain the satisfactory contrast without controlling so that they are not superposed among the particles having different color tones.

Further, proposed is a display liquid for electrophoretic display containing in a dispersion medium particles which are subjected to surface treatment and have voids in the inside and pigment particles which are different in a color tone from the above particles (refer to, for example, patent document 8).

However, in the above display liquid for electrophoretic display, the dispersion medium enters into the voids of the particles, and therefore particularly the white particles are reduced in a refractive index to make it difficult to obtain the satisfactory contrast.

In addition, proposed as well is a case in which a liquid prepared by dispersing at least two kinds of electrophoretic fine particles which are different in a color tone and an electrophoretic property from each other in a colorless dispersion medium is filled in microcapsules (refer to, for example, patent document 9). However, involved therein are the problems that the contrast is weakened by a resin layer of the microcapsule and that unevenness is formed in contrast on the display face by having the curved face part.

On the other hand, known is a suspension for electrophoretic display containing colored, charged electrophoretic particles absorbing light, transparent particles transmitting light and a dispersion medium for dispersing the colored, charged electrophoretic particles and the transparent particles for the purpose of providing an electrophoretic display device having an electrooptical characteristic of high contrast and a displayed image memory property after applying an electric field, wherein a refractive index $n_1$ of the transparent particles is $1.4n_2 \geq n_1 \geq 0.86n_2$ based on a refractive index $n_2$ of the dispersion medium (refer to, for example, patent document 10).

However, the suspension for electrophoretic display disclosed in the patent document 10 reduces the effective aperture rate in light display and is completely different in subjects and technical concepts from the present invention (constitution, effects thereof and the like).

PRIOR ART DOCUMENT

Patent document

Patent document 1: U.S. Pat. No. 3,612,758 (claims, examples and others)
Patent document 2: Japanese Patent No. 2733687 (claims, examples and others)
Patent document 3: Japanese Patent Application Laid-Open Hei 17 No. 326456 (claims, examples and others)
Patent document 4: Japanese Patent No. 2551783 (claims, examples and others)
Patent document 5: Japanese Patent Application Laid-Open Sho 62 No. 269124 (claims, examples and others)
Patent document 6: Japanese Translation of PCT International Application Hei 8 No. 510790 (claims, examples and others)
Patent document 7: Japanese Patent Application Laid-Open Sho 63 No. 50886 (claims, examples and others)
Patent document 8: Japanese Patent Application Laid-Open No. 2002-277903 (claims, examples and others)
Patent document 9: WO 1998/03896 (claims, examples and others)
Patent document 10: Japanese Patent Application Laid-Open No. 2006-220969 (claims, examples and others)

OUTLINE OF THE INVENTION

Problems to be Solved by the Invention

The present invention relates to a liquid for electrophoretic display which makes it possible to display a black color having a low reflectance or a color having a high color saturation and a white color having a high reflectance and display them at high contrast, and an object thereof is to provide a liquid for electrophoretic display which inhibits coagulation of white fine particles and which is excellent in stability and an electrophoretic display device and an electronic device each prepared by using the same.

Means for Solving the Problems

Intensive studies on the problems of the conventional art described above repeated by the present inventors have resulted in succeeding in inhibiting temporary coagulation of white fine particles in displaying and enhancing a reflectance in white color display by adding fine particles having a refractive index close to that of a dispersion medium and finding that a liquid for electrophoretic display which does not cause settling of electrophoretic particles and which stabilizes display over a long period of time can be prepared by controlling a charge of the fine particles, and the present invention has come to be completed.

The present invention comprises the following items (1) to (6).

(1) A liquid for electrophoretic display containing at least white fine particles, resin particles colored by a dye and/or a pigment and a liquid phase dispersion medium, wherein fine particles in which a difference in a refractive index from the liquid phase dispersion medium is 0 to 0.05 are contained, and the fine particles have an average particle diameter of 50 to 500 nm.

(2) The liquid for electrophoretic display as described in the above item (1), wherein a content of the white fine particles is 2.0 to 6.8% by volume based on the whole liquid for electrophoretic display.

(3) The liquid for electrophoretic display as described in the above item (1) or (2), wherein a content of the fine particles is 1.0 to 35.0% by volume based on the white fine particles.

(4) The liquid for electrophoretic display as described in any of the above items (1) to (3), wherein the white fine particles comprise white titanium oxide.

(5) An electrophoretic display device, wherein the liquid for electrophoretic display as described in any one of the above items (1) to (4) is filled between a pair of substrates.

(6) An electronic device, wherein the electrophoretic display device as described in the above item (5) is mounted therein.

Effects of the Invention

According to the present invention, provided are a liquid for electrophoretic display which makes it possible to display a black color having a low reflectance or a color having a high color saturation and a white color having a high degree of whiteness and display them at high contrast and which inhibits coagulation of white fine particles and is excellent in stability and an electrophoretic display device and an electronic device each prepared by using the same.

MODE FOR CARRYING OUT THE INVENTION

Figure 1:
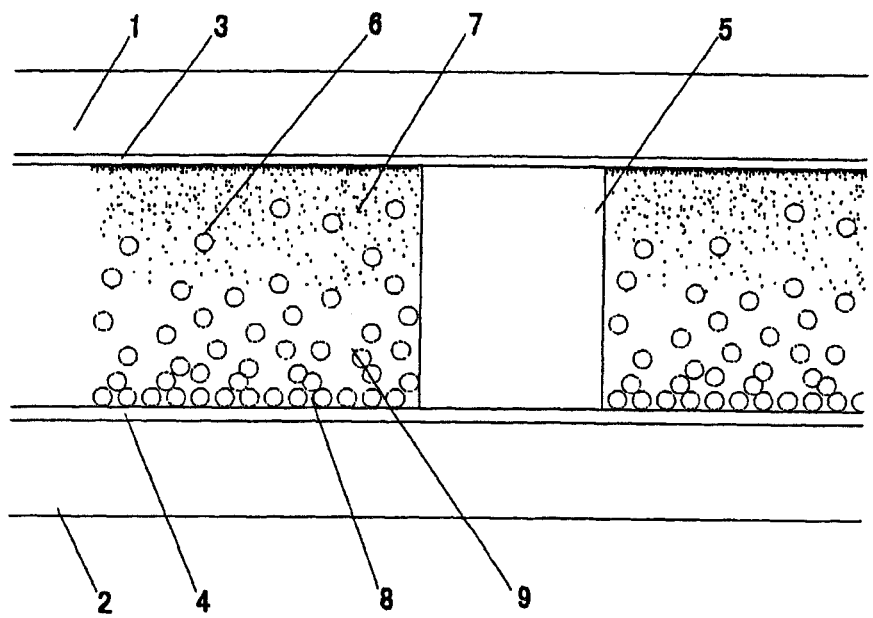
FIG. 1 is a partial cross section showing one example of a use state of an electrophoretic display device in which the liquid of the present invention for electrophoretic display is filled.

The embodiment of the present invention shall be explained below in detail by every invention.

The liquid for electrophoretic display according to the present invention is a liquid for electrophoretic display containing at least white fine particles, resin particles colored by a dye and/or a pigment and a liquid phase dispersion medium, wherein fine particles in which a difference in a refractive index from the liquid phase dispersion medium described above is 0 to 0.05 are contained, and the fine particles have an average particle diameter of 50 to 500 nm.

The white fine particles used in the present invention shall not specifically be restricted as long as they are white, and titanium oxide, zinc oxide, calcium carbonate, talc, clay, calcium silicate, silica, alumina and the like are used. They are constituted preferably from rutile-type titanium oxide. Titanium oxide of a rutile type has a good white color property and a good masking property as compared with anatase-type titanium oxide, and it has excellent characteristics as fine particles providing a white color.

From the viewpoints of enhancing the white color display characteristic, improving the repeating display property, the response and the stability of the liquid and controlling the charging characteristic, the white fine particles are preferably subjected to hydrophobicity treatment and lipophilicity treatment by a surface treating agent for hydrophobicity, a lipophilic surface treating agent and the like.

The surface treating agent for hydrophobicity includes silicone oils for hydrophobicity treatment, fluorinated oils and the like, and the lipophilic surface treating agent includes, for example, coupling agents, lipophilic surfactants and the like. The silicone oils for hydrophobicity treatment and the coupling agents are particularly preferably used from the viewpoints of the dispersibility and the fluidity.

The coupling agents which can be used include, for example, silane base coupling agents, titanate base coupling agents, aluminum base coupling agents, zirconium base coupling agents, zircoaluminate base coupling agents, chromium base coupling agents, fluorine base coupling agents and the like.

From the viewpoints of exerting further the effects of the white color display characteristic, the display memory property and the dispersion stability, the white fine particles have a primary average particle diameter of 100 to 1000 nm, preferably 120 to 300 nm.

In the present invention, the term "primary average particle diameter" means an average particle diameter of particles staying in a state of a single particle formed initially in a step of producing the pigments, and particle diameters reported by the respective materials makers are cited in the present specification.

If a primary average particle diameter of the white fine particles is less than 100 nm, an influence of diffusion is exerted by a Brownian motion of the white fine particles to reduce the display characteristics in a certain case, and coagulation tends to be strengthened, so that the dispersion system is destabilized. On the other hand, if a primary average particle diameter thereof exceeds 1000 nm, the white fine particles are liable to settle down, and it is a factor of deteriorating the display memory property and the dispersion stability.

In the present invention, the white fine particles which are preferably used include, to be specific, ITT-2 $TiO_2$ CR-50 (titanium oxide treated the surface by a titanium coupling agent, primary average particle diameter: about 250 nm, manufactured by Nikko Chemicals Co., Ltd.), particles obtained by treating the surface of KR-380 (primary average particle diameter: about 300 to 500 nm, manufactured by Titan Kogyo, Ltd.) with a lipophilic surface treating agent, particles obtained by treating the surface of KR-270 (primary average particle diameter: about 400 nm, manufactured by Titan Kogyo, Ltd.) by a lipophilic surface treating agent and titanium oxide obtained by treating Tipaque CR-50 (titanium oxide having a hydrophilic surface, primary average particle diameter: about 400 nm, manufactured by Ishihara Sangyo Kaisha, Ltd.) by silicone oil for hydrophobicity treatment.

In the present invention, a content of the white fine particles used is 2.0 to 6.8% by volume, preferably 2.4 to 6.8% by volume and more preferably 3.6 to 5.8% by volume based on the whole liquid for electrophoretic display.

If a content of the white fine particles is less than 2.0% by volume, the satisfactory masking power required for display can not be secured, and on the other hand, if it exceeds 6.8% by volume, the whole system of the display liquid is raised in a viscosity to make it less liable to carry out electrophoresis, so that that is not preferred.

The resin particles which are used in the present invention and which are colored by a dye and/or a pigment are obtained by coloring resin particles comprising an organic polymer produced by a publicly known method with a dye and/or a pigment according to a publicly known method, and the colored resin particles can be produced by, for example, a method in which monomers are colored before synthesizing and then the resin particles are produced and which is described later, a method in which the resin particles are colored in the middle of producing them and a method in which the resin particles are colored after producing them.

Further, in another method, a dye and/or a pigment are physically dispersed in a polymer material obtained by synthesizing in advance, and then it is crushed to desired particle sizes, whereby the resin particles can be obtained. However, the colored resin particles shall not be restricted to those obtained by the above methods.

In the present invention, the "resin particles" described above have very low solubility in a solvent in combination with solvents used as the liquid phase dispersion medium and represent particles which can be present in a state of particles dispersed in the solvent.

Resin particles comprising organic polymers produced by methods which have so far been publicly known can be used as the resin particles, and they include, for example, a method making use of emulsion polymerization, a seed emulsion polymerization method, a soap free polymerization method, a dispersion polymerization method, a suspension polymerization method, a seed polymerization method, a method making use of seed polymerization+polymerization contraction, a method of suspension polymerization in a W/O/W emulsion, a method making use of surface drying of droplets in spray drying and a seed coagulation method in which a polymer emulsion is coagulated by adding electrolytic solid particles. However, they shall not be restricted to those produced by the above methods.

In particular, black resin particles which are colored by a dye and/or a pigment in order to obtain display of high contrast and which have a low reflectance are desirable in the present invention. The black resin particles are obtained by coloring resin particles comprising organic polymers produced by a publicly known method black by a black dye and/or a black pigment according to a publicly known method, and the resin particles colored black can be produced by, for example, a method in which monomers are colored black before synthesizing the resin particles and the particles are produced and which is described later, a method in which the resin particles are colored black in the middle of producing them and a method in which the resin particles are colored black after producing them. Further, in another method, a black dye and/or a black pigment are physically dispersed in a polymer material obtained by synthesizing in advance, and then the polymer material is crushed to desired particle sizes, whereby the resin particles can be obtained. However, the resin particles colored black shall not be restricted to those obtained by the above methods.

To be specific, capable of being used is at least one of commercially available Rubcouleur 220 (M) Black (manufactured by Dainichiseika Color & Chemicals Mfg. Co., Ltd., black resin particles which comprise a main component of a cross-linked acryl copolymer and which are colored by carbon black, average particle diameter: about 10 μm), Rubcouleur 020 (F) Black (manufactured by Dainichiseika Color & Chemicals Mfg. Co., Ltd., black resin particles which comprise a main component of a cross-linked acryl copolymer and which are colored by carbon black, average particle diameter: about 20 μm) and the like.

Also, an average particle diameter of the resin particles colored by a dye and/or a pigment is preferably twice or more as large as an average particle diameter of the white fine particles such as titanium oxide particles from the viewpoint that a high reflectance of a white color is compatible with high contrast display.

In the present invention, a charging characteristic of the resin particles colored by a dye and/or a pigment in the liquid phase dispersion medium and a charging characteristic of the white fine particles such as titanium oxide particles are preferably different from each other in order to allow a high reflectance of a white color to be compatible with high contrast display and obtain display at a high response speed.

The term "the charging characteristics are different from each other" means not only a case in which the colored resin particles are charged negatively (positively) when the white fine particles are charged positively (negatively) but also a case in which the colored resin particles are scarcely charged when the white fine particles are charged positively or negatively and a case in which the colored resin particles are charged positively or negatively when the white fine particles are scarcely charged. That is, even when the two kinds of particles are not charged inversely to each other, one kind of particles which are scarcely charged hardly moves when a voltage is applied, and therefore display can be carried out by moving the other charged particles to a display face side or an opposite side thereto.

Insulating media of various types which have so far been used for electrophoretic display and which have a low electric conductivity can be used as the liquid phase dispersion medium used in the present invention, and it includes, for example, at least one (alone or a mixture of two or more kinds thereof, hereinafter the same shall apply) selected from aromatic hydrocarbons, paraffins, isoparaffin base aliphatic hydrocarbons, halogenated hydrocarbons, silicone oils, terpene solvents and high purity petroleums.

To be specific, it includes aromatic hydrocarbons such as benzene, alkylbenzene derivatives such as toluene, xylene, ethylbenzene, dodecylbenzene and the like, diarylalkane derivatives such as phenylxylylethane, 1,1-ditolylethane, 1,2-ditolylethane, 1,2-bis(3,4-dimethylphenylethane) (BDMF), alkylnaphthalene derivatives such as diisopropylnaphthane, alkylbiphenyl derivatives such as monoisopropylbiphenyl, isopropylbiphenyl, isoamylbiphenyl, terphenyl derivatives which are hydrogenated in various proportions, triaryldimethane derivatives such as dibenzyltoluene, benzylnaphthalene derivatives, phenylene oxide derivatives, diarylalkylene derivatives, arylindane derivatives, polychlorinated biphenyl derivatives, naphthene base hydrocarbons and the like.

The paraffins and the isoparaffin base aliphatic hydrocarbons include, for example, paraffins, chlorinated paraffins and isoparaffins, and commercial products thereof include Isopar G, H, M and L (manufactured by Exxon Mobil Corporation), Shellsol (manufactured by Shell Chemicals Japan Ltd.), IP Solvent 1016, 1620, 2028 and 2835 (manufactured by Idemitsu Petrochemical Co., Ltd.) and the like.

Further, the halogenated hydrocarbons include, for example, chloroform, trichloroethylene, tetrachloroethylene, trifluoroethylene, tetrafluoroethylene, dichloromethane, ethyl bromide and the like.

The terpene solvents include, for example, α-limonene, α-pinene, p-cymene and the like.

Further, in addition to the compounds described above, included are linear hydrocarbons such as dodecane, tridecane, tetradecane, hexadecane, halogenated hydrocarbons such as chloroform, trichloroethylene, tetrachloroethylene, trifluoroethylene, tetrafluoroethylene, dichloromethane, ethyl bromide, phosphoric acid esters such as tricresyl phosphate, trioctyl phosphate, octyldiphenyl phosphate, tricyclohexyl phosphate, phthalic acid esters such as dibutyl phthalate, dioctyl phthalate, dilauryl phthalate, dicyclohexyl phthalate, carboxylic acid esters such as butyl oleate, diethylene glycol dibenzoate, dioctyl sebacate, dibutyl sebacate, dibutyl adipate, trioctyl trimellitate, acetyltriethyl citrate, octyl maleate, dibutyl maleate, ethyl acetate, N,N-dibutyl-2-butoxy-5-tertiaryoctyl aniline and the like, but they shall not be restricted thereto.

At least one of the above liquid phase dispersion media can be used, and Isopar H, M and L, dodecane, tridecane and tetradecane are preferably used as the liquid phase dispersion medium in the liquid for electrophoretic display since they have a high boiling point and a low viscosity.

A content of the above liquid phase dispersion media is suitably set to a suited amount according to various contained components such as the white fine particles and fine particles described later, and it shall not be unconditionally determined. It is 40 to 80% by mass based on the whole liquid for electrophoretic display.

The fine particles used in the present invention have the effects of inhibiting coagulation of the white fine particles such as titanium oxide, securing a light scattering volume of the white fine particles and enhancing the reflectance in white color display.

In order to exert the above effects, the fine particles in which a difference in a refractive index (absolute refractive index difference) from the liquid phase dispersion medium described above is 0 to 0.05 have to be used.

The fine particles in which the above absolute refractive index difference from the liquid phase dispersion medium deviates from the range (0 to 0.05) described above can not exert the effects of the present invention.

In the present invention, a "refractive index" means an "absolute refractive index" which is defined as a value intrinsic to a material when a value of the vacuum is 1.0 which is generally used.

The fine particles which can be used include, for example, at least one selected from polymer particles, inorganic particles and organic-inorganic composite particles, and they are suitably selected according to a refractive index of the liquid phase dispersion medium used.

Particles of polymer materials which are not dissolved in the liquid phase dispersion medium used for electrophoretic display can be used as the polymer particles. To be specific, capable of being listed are polymer materials of a styrene base, a styrene-acryl base, a styrene-isoprene base, a divinylbenzene base, a methyl methacrylate base, a methacrylate base, an ethyl methacrylate base, an ethyl acrylate base, a n-butyl acrylate base, an acrylic acid base, an acrylonitrile base, an acryl rubber-methacrylate base, an ethylene base, an ethylene-acrylic acid base, a nylon base, a silicone base, a urethane base, a melamine base, a benzoguanamine base, a phenol base, a fluorine (tetrachloroethylene) base, a vinylidene chloride base, a quaternary pyridinium salt base, synthetic rubber, cellulose, cellulose acetate, chitosan, calcium alginate and polymer materials in which a solvent resistant performance is improved by cross-linking the above polymer materials.

Silica particles, magnesium fluoride, calcium fluoride and the like can be listed as the inorganic particles which can be used.

Silica-acryl particles, silica-urethane particles, silica-styrene particles, silica-styrene-acryl particles and the like can be listed as the organic-inorganic composite particles which can be used.

The above particles can be used as well in combination of two or more kinds thereof.

The fine particles described above are preferably particles which are spherical and do not have voids in the inside from the viewpoint of further exerting the white color display characteristic, the further effect of dispersion stability of the white fine particles and the white color display stability. Further, an average particle diameter of the fine particles is 50 to 500 nm, preferably 100 to 300 nm. The "average particle diameter" referred to here represents an average particle diameter of particles staying in a state of a single particle which are initially formed in a particle production step.

If an average particle diameter of the fine particles is less than 50 nm, caused is the defect that a rise in a viscosity of the liquid for electrophoretic display and sticking of the particles such as the white fine particles onto the display part (electrode surface) are liable to be brought about. On the other hand, if the average particle diameter exceeds 500 nm, time for maintaining the displayed color (display memory property) is reduced, and therefore that is not preferred.

To be specific, when dodecane (refractive index: 1.42) is used as the liquid phase dispersion medium, polymer particles such as PCTFE particles (form: not hollow and spherical, average particle diameter: 250 nm, refractive index: 1.42) and inorganic particles such as silica particles (form: not hollow and spherical, average particle diameter: 100 nm, refractive index: 1.43) can be used as the fine particles. Also, when p-cymene (refractive index: 1.48) is used as the liquid phase dispersion medium, organic-inorganic composite particles such as silica-acryl particles (form: not hollow and spherical, average particle diameter: 500 nm, refractive index: 1.51) can be used as the fine particles.

The combinations described above are examples, and preferred combinations suitably selected according to a refractive index of the liquid phase dispersion medium and a refractive index of the fine particles can be used.

A content of the fine particles is 1.0 to 35.0% by volume, preferably 1.0 to 32.0% by volume and more preferably 12.6 to 30.0% by volume based on the white fine particles.

If a content of the fine particles is less than 1.0% volume based on the white fine particles, a space between the white fine particles can not sufficiently be secured, and the effects of inhibiting coagulation of the white fine particles and securing a light scattering volume thereof can not be exerted to bring about reduction in the reflectance in white color display. On the other hand, if it exceeds 35.0% by volume, a space between the white fine particles is broadened to lower the masking power in white color display and reduce the reflectance, and therefore that is not preferred.

An electrophoretic property of the fine particles used in the present invention according to applied voltage is not essential, and a charging property of the fine particles shall not specifically be restricted as long as an electrophoretic property of the white fine particles and the colored resin particles is not inhibited.

In addition to the white fine particles, the resin particles colored by a dye and/or a pigment, the liquid phase dispersion medium and the fine particles, optional components such as various kinds of dispersants, surfactants, UV absorbers, antioxidants, light stabilizers, heat stabilizers, fungicides and the like which are conventionally used for a liquid for electrophoretic display can be added to the liquid for electrophoretic display of the present invention as long as the effects of the present invention are not damaged.

The liquid for electrophoretic display of the present invention can be prepared by mixing and stirring at least the white fine particles, the resin particles colored by a dye and/or a pigment, the liquid phase dispersion medium and the fine particles in which a difference in a refractive index from the liquid phase dispersion medium is 0 to 0.05 and which has an average particle diameter of 50 to 500 nm and then subjecting the mixture to various dispersion treatments including mediumless dispersion such as supersonic dispersion and dispersion using a medium carried out by means of a wet bead mill, but it shall not be restricted to the above methods.

Further, wet and dry classifying treatment, filtration treatment and the like can be carried out, if necessary, in order to control the particle diameters and the particle size distributions of the white fine particles, the resin particles colored by a dye and/or a pigment and the fine particles.

The liquid for electrophoretic display of the present invention thus constituted is a liquid for electrophoretic display containing at least the white fine particles, the resin particles colored by a dye and/or a pigment and the liquid phase dispersion medium, and the fine particles in which a difference in a refractive index from the liquid phase dispersion medium is 0 to 0.05 and which has an average particle diameter of 50 to 500 nm are contained therein and used, whereby the effects of inhibiting coagulation of the white fine particles themselves and securing a light scattering volume thereof are exerted by the fine particles. Accordingly, a light scattering efficiency of the white fine particles can be exerted to a maximum extent, and white color display having a high white color reflectance can be obtained. Further, the particles are liable to be redispersed in operation, and therefore the liquid which is excellent in operation at a low voltage and response at a high speed can be provided.

The electrophoretic display device of the present invention is characterized by filling the liquid for electrophoretic display according to the present invention between a pair of substrates.

The electrophoretic display device of the present invention shall not specifically be restricted as long as it is provided with the constitution described above, and it includes, for example, a) an electrophoretic display device in which a pair of base materials for display equipped with electrodes on one face of a substrate are arranged via a spacer (rib) so that the electrode faces are oppositely disposed to form a space and the liquid for electrophoretic display according to the present invention is filled into the space and in which at least one base material for display is a transparent substrate provided on one face thereof with a transparent electrode and b) an electrophoretic display device in which an insulating film is oppositely disposed via a spacer on a base material for display equipped with electrodes on one face of a substrate to form a space and the liquid for electrophoretic display according to the present invention is filled into the space and in which at least one of the base material for display and the insulating film is transparent.

FIG. 1 shows one example of embodiments (use state) of an electrophoretic display device in which the liquid for electrophoretic display of the present invention is filled, wherein in the above electrophoretic display device, a first substrate 1 equipped with a transparent electrode 3 and a second substrate 2 equipped with an electrode 4 are arranged via a spacer (rib) 5 so that the electrode faces are oppositely disposed to form a space, and the liquid of the present invention for electrophoretic display (6: white fine particles (titanium oxide particles), 7: fine particles, 8: colored fine particles and 9: liquid phase dispersion medium) is filled into the space.

Figure 2:
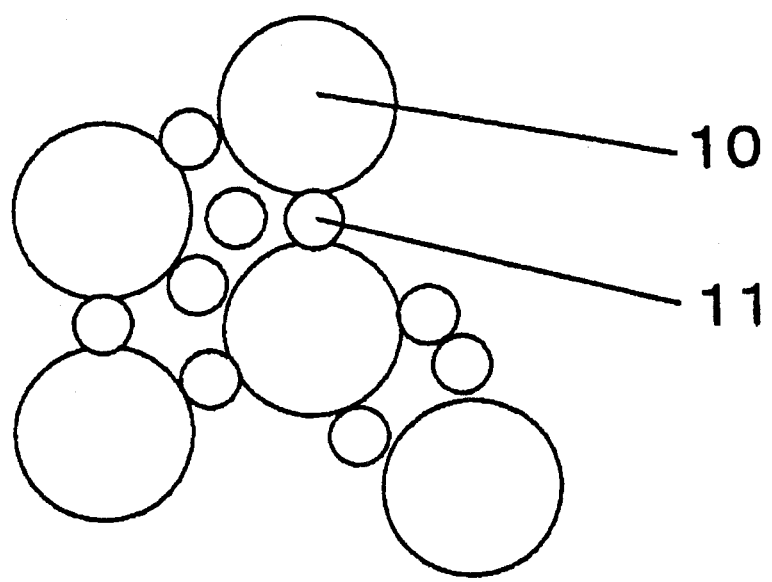
FIG. 2 is a drawing schematically showing the states of the white fine particles and the fine particles observed when the electrophoretic display device is operated to display a white color.

FIG. 2 is a drawing schematically showing the states of the white fine particles 10 and the fine particles 11 when the electrophoretic display device is operated to display a white color, wherein since the fine particles 11 have the effect of a spacer for inhibiting coagulation of the white fine particles 10 themselves, a light scattering efficiency of the white fine particles can be exerted to a maximum extent, and the particles are liable to be redispersed in operation.

Since the liquid for electrophoretic display of the present invention which exerts the action and effects described above is filled in the electrophoretic display device of the present invention, the contrast on a display face, particularly the white color reflectance is high, and the contrast can be displayed with high reliability. In addition thereto, the display device is excellent as well in operation at a low voltage and response at a high speed.

The electronic device of the present invention is characterized by loading the electrophoretic display device of the present invention. The electronic device includes, for example, outdoor & indoor markers, outdoor & indoor guide plates, electronic databooks, electronic calculators, cellular phones, audio devices for cellular phones, personal computers, word processors, work stations, POS terminals, POP advertising towers, touch panels, instruments equipped with car navigation devices and the like, and the electrophoretic display device of the present invention can be used in display regions of the above electronic devices.

Also when the electrophoretic display device of the present invention is loaded in the above various electronic devices, the same effects as in the embodiment of the electrophoretic display device described above are exerted. Also, the respective electronic devices can be reduced in a size and a weight, and an electric power consumption thereof can be cut to a large extent. As a result, the respective electronic devices can realize compatibility of a low electric power consumption with a satisfactory display quality.

EXAMPLES

Next, the present invention shall be explained in detail with reference to examples and comparative examples, but the present invention shall not be restricted to the examples as long as it does not deviate from the scope of the present invention.

Examples 1 to 10 and Comparative Examples 1 to 7

Preparation of White Fine Particles

Two parts by mass of silicone oil for hydrophobicity treatment (KF99, manufactured by Shin-Etsu Chemical Co., Ltd.) were added to 100 parts by mass of titanium oxide (CR50, primary average particle diameter: 250 nm, manufactured by Ishiwara Sangyo Kaisha, Ltd.), and the mixture was evenly stirred by means of a kneader. Then, it was baked at 150° C. for 20 minutes.

<Preparation of Black Fine Particle Solution>

Cross-linked acryl copolymer particles (Rubcouleur 220MD, average particle diameter: 9 μm, manufactured by Dainichiseika Color & Chemicals Mfg. Co., Ltd.) containing carbon black were dispersed in normal decane (liquid phase dispersion medium, refractive index: 1.42, manufactured by Wako Pure Chemical Industries, Ltd.) containing polyoxyethylene (6) sorbitan tetraoleate (dispersant, manufactured by Wako Pure Chemical Industries, Ltd.), and the dispersion was allowed to pass through a filter to remove coarse particles, whereby a black fine particle solution was obtained. A solid content of the solution was measured by means of a measuring equipment (manufactured by Mettler Toledo International Inc.) to adjust the solid content to 25% by mass.

<Preparation of Fine Particles A>

Silica particles were used as fine particles having a refractive index approximate to that of the liquid phase dispersion medium used this time. Then, 100 parts by mass of silica spherical particles (KE-P10, average particle diameter: 100 nm, manufactured by Nippon Shokubai Co., Ltd.) was treated with 0.2 part by mass of silicone oil for hydrophobicity treatment (KF99, manufactured by Shin-Etsu Chemical Co., Ltd.) in order to disperse the particles in the dispersion medium. Baking treatment was carried out under the same conditions as those of the white fine particles.

<Preparation of Fine Particles B>

Silica spherical particles (KE-P30, average particle diameter: 300 nm, manufactured by Nippon Shokubai Co., Ltd.) were treated by the same method as in preparing fine particles A.

<Preparation of Fine Particles C>

Silica spherical particles (KE-P50, average particle diameter: 500 nm, manufactured by Nippon Shokubai Co., Ltd.) were treated by the same method as in preparing fine particles A.

<Preparation of Fine Particles D>

Silica spherical particles (Aerosil OX50, average particle diameter: 40 nm, manufactured by Degussa AG.) were treated by the same method as in preparing fine particles A.

<Preparation of Fine Particles E>

Silica spherical particles (HPS-1000, average particle diameter: 1000 nm, manufactured by Toagosei Co., Ltd.) were treated by the same method as in preparing fine particles A.

<Preparation of Fine Particles F>

Hollow particles (SX8782 (P), average particle diameter: 500 nm, manufactured by JSR Corporation) were used.

<Preparation of Fine Particles G>

Acryl particles (Techpolymer, average particle diameter: 500 nm, manufactured by Sekisui Chemical Co., Ltd.) were used.

<Preparation of Fine Particles H>

Polystyrene particles (SX-130H, average particle diameter: 1300 nm, manufactured by Soken Chemical & Engineering Co., Ltd.) were used.

<Preparation of Fine Particles I>

Melamine particles (Optbeads, average particle diameter: 500 nm, manufactured by Nissan Chemical Industries, Ltd.) were used.

Preparation of Liquid for Electrophoretic Display

Example 1

The white fine particles 10 parts by mass, the black fine particle solution 80 parts by mass and fine particles A 1.5 part by mass each described above were mixed and subjected to supersonic dispersion for 1 hour to prepare a liquid for electrophoretic display.

A content of the white fine particles was 2.4% by volume; a content of the black fine particles was 15.4% by volume; a content of fine particles A was 0.76% by volume; a content of fine particles A based on the white fine particles was 31.7% by volume; and a difference in a refractive index between the liquid phase dispersion medium and fine particles A was 0.01.

Example 2

The white fine particles 15 parts by mass, the black fine particle solution 80 parts by mass and fine particles A 1.5 part by mass each described above were mixed and subjected to supersonic dispersion for 1 hour to prepare a liquid for electrophoretic display.

A content of the white fine particles was 3.6% by volume; a content of the black fine particles was 15.4% by volume; a content of fine particles A was 0.75% by volume; a content of fine particles A based on the white fine particles was 20.8% by volume; and a difference in a refractive index between the liquid phase dispersion medium and fine particles A was 0.01.

Example 3

The white fine particles 20 parts by mass, the black fine particle solution 80 parts by mass and fine particles A 1.5 part by mass each described above were mixed and subjected to supersonic dispersion for 1 hour to prepare a liquid for electrophoretic display.

A content of the white fine particles was 4.7% by volume; a content of the black fine particles was 15.2% by volume; a content of fine particles A was 0.74% by volume; a content of fine particles A based on the white fine particles was 15.7% by volume; and a difference in a refractive index between the liquid phase dispersion medium and fine particles A was 0.01.

Example 4

The white fine particles 25 parts by mass, the black fine particle solution 80 parts by mass and fine particles A 1.5 part by mass each described above were mixed and subjected to supersonic dispersion for 1 hour to prepare a liquid for electrophoretic display.

A content of the white fine particles was 5.8% by volume; a content of the black fine particles was 15.1% by volume; a content of fine particles A was 0.73% by volume; a content of fine particles A based on the white fine particles was 12.6% by volume; and a difference in a refractive index between the liquid phase dispersion medium and fine particles A was 0.01.

Example 5

The white fine particles 20 parts by mass, the black fine particle solution 80 parts by mass and fine particles B 1.5 part by mass each described above were mixed and subjected to supersonic dispersion for 1 hour to prepare a liquid for electrophoretic display.

A content of the white fine particles was 4.7% by volume; a content of the black fine particles was 15.2% by volume; a content of fine particles B was 0.74% by volume; a content of fine particles B based on the white fine particles was 15.7% by volume; and a difference in a refractive index between the liquid phase dispersion medium and fine particles B was 0.01.

Example 6

The white fine particles 20 parts by mass, the black fine particle solution 80 parts by mass and fine particles C 1.5 part by mass each described above were mixed and subjected to supersonic dispersion for 1 hour to prepare a liquid for electrophoretic display.

A content of the white fine particles was 4.7% by volume; a content of the black fine particles was 15.2% by volume; a content of fine particles C was 0.74% by volume; a content of fine particles C based on the white fine particles was 15.7% by volume; and a difference in a refractive index between the liquid phase dispersion medium and the fine particles C was 0.01.

Example 7

The white fine particles 5 parts by mass, the black fine particle solution 80 parts by mass and fine particles A 1.5 part by mass each described above were mixed and subjected to supersonic dispersion for 1 hour to prepare a liquid for electrophoretic display.

A content of the white fine particles was 1.2% by volume; a content of the black fine particles was 15.8% by volume; a content of fine particles A was 0.77% by volume; a content of fine particles A based on the white fine particles was 64.2% by volume; and a difference in a refractive index between the liquid phase dispersion medium and fine particles A was 0.01.

Example 8

The white fine particles 30 parts by mass, the black fine particle solution 80 parts by mass and fine particles A 1.5 part by mass each described above were mixed and subjected to supersonic dispersion for 1 hour to prepare a liquid for electrophoretic display.

A content of the white fine particles was 6.9% by volume; a content of the black fine particles was 14.9% by volume; a content of fine particles A was 0.73% by volume; a content of fine particles A based on the white fine particles was 10.6% by volume; and a difference in a refractive index between the liquid phase dispersion medium and fine particles A was 0.01.

Example 9

The white fine particles 20 parts by mass, the black fine particle solution 80 parts by mass and fine particles A 0.05 part by mass each described above were mixed and subjected to supersonic dispersion for 1 hour to prepare a liquid for electrophoretic display.

A content of the white fine particles was 4.8% by volume; a content of the black fine particles was 15.4% by volume; a content of fine particles A was 0.02% by volume; a content of fine particles A based on the white fine particles was 0.42% by volume; and a difference in a refractive index between the liquid phase dispersion medium and fine particles A was 0.01.

Example 10

The white fine particles 20 parts by mass, the black fine particle solution 80 parts by mass and fine particles A 3 parts by mass each described above were mixed and subjected to supersonic dispersion for 1 hour to prepare a liquid for electrophoretic display.

A content of the white fine particles was 4.7% by volume; a content of the black fine particles was 15.1% by volume; a content of fine particles A was 1.48% by volume; a content of fine particles A based on the white fine particles was 31.5% by volume; and a difference in a refractive index between the liquid phase dispersion medium and fine particles A was 0.01.

Comparative Example 1

The white fine particles 20 parts by mass, the black fine particle solution 80 parts by mass and fine particles D 1.5 part by mass each described above were mixed and subjected to supersonic dispersion for 1 hour to prepare a liquid for electrophoretic display.

A content of the white fine particles was 4.7% by volume; a content of the black fine particles was 15.2% by volume; a content of fine particles D was 0.74% by volume; a content of fine particles D based on the white fine particles was 15.7% by volume; and a difference in a refractive index between the liquid phase dispersion medium and fine particles D was 0.03.

Comparative Example 2

The white fine particles 20 parts by mass, the black fine particle solution 80 parts by mass and fine particles E 1.5 part by mass each described above were mixed and subjected to supersonic dispersion for 1 hour to prepare a liquid for electrophoretic display.

A content of the white fine particles was 4.7% by volume; a content of the black fine particles was 15.2% by volume; a content of fine particles E was 0.74% by volume; a content of fine particles E based on the white fine particles was 15.7% by volume; and a difference in a refractive index between the liquid phase dispersion medium and fine particles E was 0.01.

Comparative Example 3

The white fine particles 20 parts by mass and the black fine particle solution 80 parts by mass were mixed and subjected to supersonic dispersion for 1 hour to prepare a liquid for electrophoretic display.

A content of the white fine particles was 4.8% by volume and a content of the black fine particles was 15.4% by volume.

Comparative Example 4

The white fine particles 20 parts by mass, the black fine particle solution 80 parts by mass and fine particles F 1.5 part by mass each described above were mixed and subjected to supersonic dispersion for 1 hour to prepare a liquid for electrophoretic display.

A content of the white fine particles was 4.7% by volume; a content of the black fine particles was 15.1% by volume; a content of fine particles F was 1.93% by volume; a content of fine particles F based on the white fine particles was 41.1% by volume; and a difference in a refractive index between the liquid phase dispersion medium and fine particles F was 0.08.

Comparative Example 5

The white fine particles 20 parts by mass, the black fine particle solution 80 parts by mass and fine particles G 1.5 part by mass each described above were mixed and subjected to supersonic dispersion for 1 hour to prepare a liquid for electrophoretic display.

A content of the white fine particles was 4.7% by volume; a content of the black fine particles was 15.2% by volume; a content of fine particles G was 1.24% by volume; a content of fine particles G based on the white fine particles was 26.4% by volume; and a difference in a refractive index between the liquid phase dispersion medium and fine particles G was 0.07.

Comparative Example 6

The white fine particles 20 parts by mass, the black fine particle solution 80 parts by mass and fine particles H 1.5 part by mass each described above were mixed and subjected to supersonic dispersion for 1 hour to prepare a liquid for electrophoretic display.

A content of the white fine particles was 4.7% by volume; a content of the black fine particles was 15.2% by volume; a content of fine particles H was 1.36% by volume; a content of fine particles H based on the white fine particles was 28.9% by volume; and a difference in a refractive index between the liquid phase dispersion medium and fine particles H was 0.17.

Comparative Example 7

The white fine particles 20 parts by mass, the black fine particle solution 80 parts by mass and the fine particles I 1.5 part by mass each described above were mixed and subjected to supersonic dispersion for 1 hour to prepare a liquid for electrophoretic display.

A content of the white fine particles was 4.7% by volume; a content of the black fine particles was 15.2% by volume; a content of fine particles I was 0.89% by volume; a content of fine particles I based on the white fine particles was 18.9% by volume; and a difference in a refractive index between the liquid phase dispersion medium and fine particles I was 0.23.

The liquids for electrophoretic display obtained in Examples 1 to 10 and Comparative Examples 1 to 7 (the following Table 1) were used to prepare the respective media for electrophoretic display by the following method, and the reflectance on the white color display face, the reflectance on the colored display face, the contrast and the displayed color retaining property (memory property) were evaluated by the following evaluation methods while changing the operating voltage.

The results obtained by evaluating the physical properties of the above media for electrophoretic display are shown in the following Table 2.

<Preparation of Electrophoretic Display Medium by Using Liquid for Electrophoretic Display>

PET film substrates having a thickness of 125 μm in which a transparent conductive film (ITO film) was deposited on one surface were arranged oppositely with the transparent conductive films turned to the inside, and a space formed between the above substrates was filled with a liquid for electrophoretic display obtained in Examples 1 to 10 and Comparative Examples 1 to 7 to prepare electrophoretic display media. A spacer was interposed between the film substrates so that a space between them was 40 μm, and the circumference thereof was sealed by using a UV-curing adhesive.

<Evaluation of Physical Properties of Electrophoretic Display Media>

The respective electrophoretic display media prepared in the examples and the comparative examples by the method described above were used for electrophoretic display by applying a voltage of +50 V or −50 V via the electrode of the medium to measure a reflectance on a white color or black color display face by means of a spectrophotometric color meter (SC-T(P), manufactured by Suga Test Instruments Co., Ltd.).

The following measuring conditions were used:
Optical condition: diffused illumination 8°, light receiving: d8 system (excluding regular reflection)
Light source: 12 V, 50 W, halogen lamp
Color measuring condition: D65 light, 10° visual field
Measuring area: 5

<Evaluation of Contrast Ratio>

A voltage of +50 V or −50 V was applied to set one visible display part to white color display, and a focus was concentrated onto the outermost side display face thereof to measure white color reflection. Then, a voltage of −50 V or +50 V which was reverse to the first case was applied to change the visible display part to black color display, and a reflectance on the black color display face was measured in the same manner. The contrast ratio was calculated from a ratio thereof (reflectance on the white color display face/reflectance on the black color display face).

<Evaluation of Repetitive Display Performance>

Time for applying a voltage of +50 V or −50 V was set to 1 second in white color display and black color display, and time for interval was set to 1 second to evaluate a repetitive display performance. Repetitive display was carried out until coagulation could be visually confirmed. An upper limit thereof was set to 100,000 times.

<Evaluation of Displayed Color Retaining Property (Memory Property)>

Time for applying a voltage of +50 V or −50 V was set to 1 second in white color display and black color display to evaluate a displayed color retaining property. The reflectance was measured every time 5 minutes passed, and it was repeated in 1 hour.

TABLE 1

| | | Example | | | | | | | | | | Comparative Example | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 | 6 | 7 |
| White particle *1 | White color concentration (wt %) | 10 | 15 | 20 | 25 | 20 | 20 | 5 | 30 | 20 | 20 | 20 | 20 | 20 | 20 | 20 | 20 | 20 |
| | Volume (cm³) | 2.4 | 3.6 | 4.8 | 6.0 | 4.8 | 4.8 | 1.2 | 7.1 | 4.8 | 4.8 | 4.8 | 4.8 | 4.8 | 4.8 | 4.8 | 4.8 | 4.8 |
| | Volume (vol %) | 2.4 | 3.6 | 4.7 | 5.8 | 4.7 | 4.7 | 1.2 | 6.9 | 4.8 | 4.7 | 4.7 | 4.7 | 4.8 | 4.7 | 4.7 | 4.7 | 4.7 |
| Black particle *2 | Black color concentration (wt %) | 20 | 20 | 20 | 20 | 20 | 20 | 20 | 20 | 20 | 20 | 20 | 20 | 20 | 20 | 20 | 20 | 20 |
| | Volume (cm³) | 15.4 | 15.4 | 15.4 | 15.4 | 15.4 | 15.4 | 15.4 | 15.4 | 15.4 | 15.4 | 15.4 | 15.4 | 15.4 | 15.4 | 15.4 | 15.4 | 15.4 |
| | Volume (vol %) | 15.6 | 15.4 | 15.2 | 15.1 | 15.2 | 15.2 | 15.8 | 14.9 | 15.4 | 15.1 | 15.2 | 15.2 | 15.4 | 15.1 | 15.2 | 15.2 | 15.2 |
| Fine particle *3 | Particle kind | A | A | A | A | B | C | A | A | A | A | D | E | — | F | G | H | I |
| | Concentration (wt %) | 1.5 | 1.5 | 1.5 | 1.5 | 1.5 | 1.5 | 1.5 | 1.5 | 0.05 | 3 | 1.5 | 1.5 | 0 | 1.5 | 1.5 | 1.5 | 1.5 |
| | Volume (cm³) | 0.75 | 0.75 | 0.75 | 0.75 | 0.75 | 0.75 | 0.75 | 0.75 | 0.025 | 1.5 | 0.75 | 0.75 | 0 | 1.97 | 1.26 | 1.38 | 0.90 |
| | Volume (vol %) | 0.76 | 0.75 | 0.74 | 0.73 | 0.74 | 0.74 | 0.77 | 0.73 | 0.02 | 1.48 | 0.74 | 0.74 | 0 | 1.93 | 1.24 | 1.36 | 0.89 |
| | Ratio based on white color | 31.7 | 20.8 | 15.7 | 12.6 | 15.7 | 15.7 | 64.2 | 10.6 | 0.42 | 31.5 | 15.7 | 15.7 | 0 | 41.1 | 26.4 | 28.9 | 18.9 |

TABLE 1-continued

|  |  | Example | | | | | | | | | | Comparative Example | | | | | | |
| --- | --- | --- | --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 1 | 2 | 3 | 4 | 5 | 6 | 7 |
| Liquid phase dispersion medium *4 | Dispersion medium amount (wt %) | 60 | 60 | 60 | 60 | 60 | 60 | 60 | 60 | 60 | 60 | 60 | 60 | 60 | 60 | 60 | 60 | 60 |
|  | Volume ($cm^3$) | 80 | 80 | 80 | 80 | 80 | 80 | 80 | 80 | 80 | 80 | 80 | 80 | 80 | 80 | 80 | 80 | 80 |
|  | Volume (vol %) | 81.2 | 80.2 | 79.3 | 78.4 | 79.3 | 79.3 | 82.2 | 77.5 | 79.9 | 78.7 | 78.7 | 79.3 | 79.9 | 78.3 | 78.9 | 78.8 | 79.2 |
|  | Refractive index difference | 0.01 | 0.01 | 0.01 | 0.01 | 0.01 | 0.01 | 0.01 | 0.01 | 0.01 | 0.01 | 0.03 | 0.01 | — | 0.08 | 0.07 | 0.17 | 0.23 |

*1: silicone oil (KF99, manufactured by Shin-Etsu Chemical Co., Ltd.)-treated titanium oxide (CR50, primary average particle diameter: 250 nm, manufactured by Ishiwara Sangyo Kaisha Ltd.)
*2: acryl base polymer fine particles (220MD, average particle diameter: 9 μm, manufactured by Dainichiseika Color & Chemicals Mfg. Co., Ltd.) containing carbon black
*3: fine particles
A: silicone oil (KF99, manufactured by Shin-Etsu Chemical Co., Ltd.)-treated silica spherical particles (KE-P10, average particle diameter: 100 nm, refractive index: 1.43, manufactured by Nippon Shokubai Co., Ltd.)
B: silicone oil (KF99, manufactured by Shin-Etsu Chemical Co., Ltd.)-treated silica spherical particles (KE-P30, average particle diameter: 300 nm, refractive index: 1.43, manufactured by Nippon Shokubai Co., Ltd.)
C: silicone oil (KF99, manufactured by Shin-Etsu Chemical Co., Ltd.)-treated silica spherical particles (KE-P50, average particle diameter: 500 nm, refractive index: 1.43, manufactured by Nippon Shokubai Co., Ltd.)
D: silicone oil (KF99, manufactured by Shin-Etsu Chemical Co., Ltd.)-treated silica particles (Aerosil OX50, average particle diameter: about 40 nm, refractive index: 1.45, manufactured by Degussa AG.)
E: silicone oil (KF99, manufactured by Shin-Etsu Chemical Co., Ltd.)-treated silica spherical particles (HPS-1000, average particle diameter: 1000 nm, refractive index: 1.43, manufactured by Toagosei Co., Ltd.)
F: hollow particles (SX8782 (P), average particle diameter: 500 nm, refractive index: 1.50, manufactured by JSR Corporation)
G: acryl particles (Techpolymer, average particle diameter: 500 nm, refractive index: 1.49, manufactured by Sekisui Chemical Co., Ltd.)
H: polystyrene particles (SX-130H, average particle diameter: 1300 nm, refractive index: 1.59, manufactured by Soken Chemical & Engineering Co., Ltd.)
I: melamine particles (Optbeads, average particle diameter: 500 nm, refractive index: 1.65, manufactured by Nissan Chemical Industries, Ltd.)
*4: dodecane (refractive index: 1.42)

TABLE 2

|  | Y value of white color display (%) | Y value of black color display (%) | Contrast | Repetitive display frequency | Displayed color retaining property (memory property) |
| --- | --- | --- | --- | --- | --- |
| Example 1 | 35.8 | 2.5 | 14.3 | 100,000 times | 1 hour or longer |
| Example 2 | 50.8 | 2.5 | 20.3 | 100,000 times | 1 hour or longer |
| Example 3 | 51.7 | 2.0 | 25.9 | 100,000 times | 1 hour or longer |
| Example 4 | 51.2 | 2.3 | 22.3 | 100,000 times | 1 hour or longer |
| Example 5 | 51.5 | 2.1 | 24.5 | 100,000 times | 1 hour or longer |
| Example 6 | 51.5 | 2.4 | 21.5 | 100,000 times | 1 hour or longer |
| Example 7 | 29.2 | 2.2 | 13.3 | 100,000 times | 1 hour or longer |
| Example 8 | 50.4 | 4.3 | 11.7 | 100,000 times | 1 hour or longer |
| Example 9 | 40.4 | 4.8 | 8.4 | 100,000 times | 1 hour or longer |
| Example 10 | 51.2 | 5.0 | 10.2 | 100,000 times | 1 hour or longer |
| Comparative Example 1 | 38.7 | 4.8 | 8.1 | 1000 times | 1 hour or longer |
| Comparative Example 2 | 51.3 | 2.5 | 20.5 | 100,000 times | 5 minutes |
| Comparative Example 3 | 40.2 | 5.0 | 8.0 | 30,000 times | 1 hour or longer |
| Comparative Example 4 | 45.5 | 4.0 | 11.4 | 100,000 times | 30 minutes |
| Comparative Example 5 | 45.3 | 4.5 | 10.1 | 100,000 times | 30 minutes |
| Comparative Example 6 | 43.5 | 4.2 | 10.4 | 50,000 times | 5 minutes |
| Comparative Example 7 | 46.7 | 6.7 | 7.0 | 50,000 times | 30 minutes |

As apparent from the results shown in Table 1 and Table 2, the media for electrophoretic display prepared in Examples 1 to 10 falling in the scope of the present invention are excellent, as compared with the media for electrophoretic display prepared in Comparative Examples 1 to 7 falling outside the scope of the present invention, in a reflectance (the higher reflectance is white, and the lower reflectance is black) on the white color display face and the colored display face and excellent as well in a hue of white color display and colored display which are visually observed, and they are free of coagulation and adhesion of the fine particles and excellent in response and contrast. Further, they have provided the result that the repetitive display and the memory property are satisfactory as well.

Further, as is the case with Examples 2 to 6, more preferred results have been obtained by setting a content of the white fine particles to 3.6 to 5.8% by volume based on the whole liquid for electrophoretic display.

INDUSTRIAL APPLICABILITY

The liquid for electrophoretic display thus constituted according to the present invention and the display medium and the display device each prepared by using the same can make contrast display with high reliability by realizing display having high contrast because the liquid for electrophoretic display is excellent in dispersion stability and a repetitive display performance, and therefore they can suitably be applied as portable type display devices for information terminal appliances, electronic price tags, electronic books and the like.

LIST OF REFERENCE NUMERALS

1 First substrate
2 Second substrate
3 Transparent electrode
4 Electrode
5 Spacer (rib)
6 White fine particles (titanium oxide particles)
7 Light scattering volume-securing fine particles
8 Colored fine particles
9 Liquid phase dispersion medium

The invention claimed is:

1. A liquid for electrophoretic display, comprising white fine particles, resin particles colored by a dye and/or a pigment, fine particles other than the white fine particles and the resin particles colored by a dye and/or a pigment having no electric charge and being substantially invisible, and a liquid phase dispersion medium, wherein the fine particles have a difference of 0 to 0.05 in a refractive index from the liquid phase dispersion medium, and the fine particles have an average particle diameter of 50 to 500 nm.

2. The liquid for electrophoretic display according to claim 1, wherein a content of the white fine particles is 2.0 to 6.8% by volume based on the whole liquid for electrophoretic display.

3. The liquid for electrophoretic display according to claim 1, wherein a content of the fine particles is 1.0 to 35.0% by volume based on the white fine particles.

4. The liquid for electrophoretic display according to claim 1, wherein the white fine particles comprise white titanium oxide.

5. An electrophoretic display device, wherein the liquid for electrophoretic display according to claim 1 is filled between a pair of substrates.

6. An electronic device, wherein the electrophoretic display device according to claim 5 is mounted therein.

* * * * *

UNITED STATES PATENT AND TRADEMARK OFFICE
CERTIFICATE OF CORRECTION

PATENT NO. : 8,605,353 B2  
APPLICATION NO. : 13/256086  
DATED : December 10, 2013  
INVENTOR(S) : Yosuke Setagawa It is certified that error appears in the above-identified patent and that said Letters Patent is hereby corrected as shown below:

On the Title page
Change

"(22) PCT Filed: March 2, 2010"

To Be

--(22) PCT Filed: March 3, 2010--

Signed and Sealed this  
Twenty-seventh Day of May, 2014

Michelle K. Lee  
*Deputy Director of the United States Patent and Trademark Office*